No. 623,494. Patented Apr. 18, 1899.
W. H. TIVY & J. E. HILL.
TAKE-UP DEVICE FOR TWINE HOLDERS.
(Application filed Sept. 28, 1898.)
(No Model.)
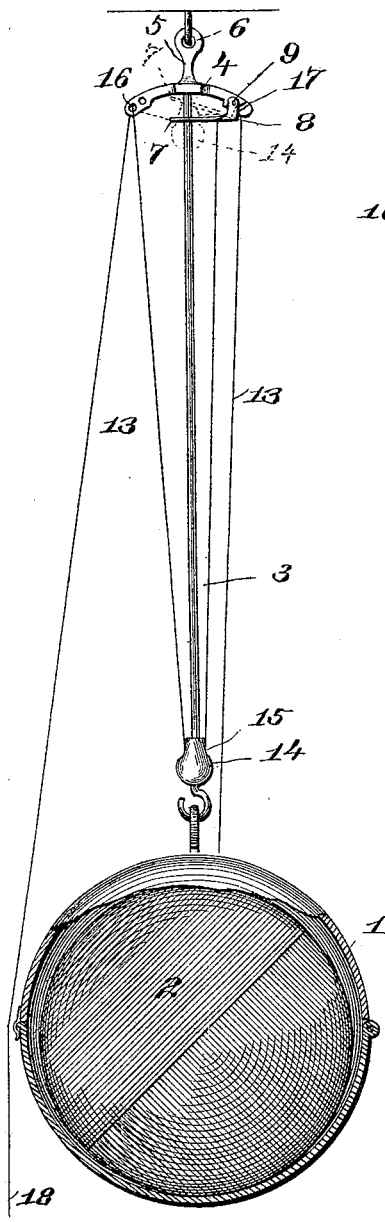
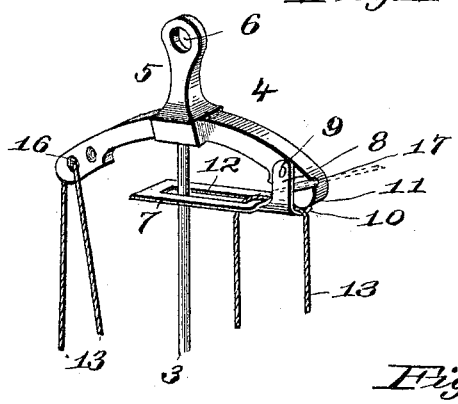
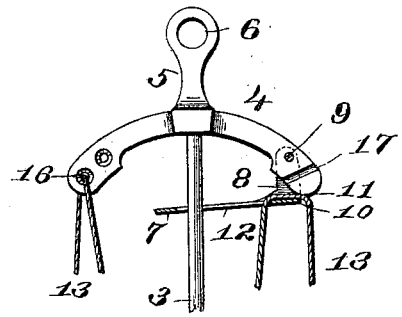
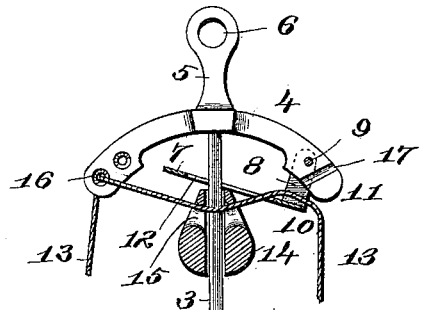
Witnesses
Inventors
William H. Tivy.
John E. Hill.
By Knight Bro
Attorneys.

United States Patent Office.

WILLIAM H. TIVY AND JOHN E. HILL, OF ST. LOUIS, MISSOURI, ASSIGNORS TO THE AMERICAN ROLL PAPER COMPANY, OF SAME PLACE.

TAKE-UP DEVICE FOR TWINE-HOLDERS.

SPECIFICATION forming part of Letters Patent No. 623,494, dated April 18, 1899.

Application filed September 28, 1898. Serial No. 692,112. (No model.)

*To all whom it may concern:*

Be it known that we, WILLIAM H. TIVY and JOHN E. HILL, subjects of the Queen of Great Britain, and residents of the city of St. Louis, in the State of Missouri, have invented certain new and useful Improvements in Take-Up Devices for Twine-Holders, of which the following is a full, clear, and exact description, reference being had to the accompanying drawings, forming part of this specification.

Our invention relates to a device for taking up the end of a ball of twine after it has been broken off in tying a parcel. It is customary for merchants to support a ball of twine in a basket hung from the ceiling, and when a parcel has been tied and the twine broken off the end of the twine hangs down near the counter; in the way and the object of our invention is to produce a simple and effective device for drawing up this end of the twine out of the way when it has been broken off, the action of the device being automatic.

Our invention consists in features of novelty hereinafter fully described, and pointed out in the claims.

Figure I is a side elevation of our improved device, the basket that receives the ball being shown mostly in section. Fig. II is an enlarged perspective view of the upper end of the device. Fig. III is a side view of same. Fig. IV is a similar view showing the parts in the position they occupy as the twine is being used.

Referring to the drawings, 1 represents a common form of basket for receiving a ball of twine 2. The basket is suspended from the ceiling or other support by a rod 3, having a head 4 on its upper end. We have shown the head in the form of an arched bar, from the under side of which the rod 3 extends and from the upper side of which there extends a stem 5, having an eye 6 to receive the staple by which the device is suspended.

7 represents a lever having ears 8, pivoted to the head at 9 in such a position as to have the outer end 10 of the lever close up against one end 11 of the head 4, as shown in Figs. II and III, so that when the lever is free it will be held in substantially a horizontal position with its outer end resting against the under side of the end 11 of the head, the inner end of the lever being a short distance beneath the under side of the head, so as to be capable of being moved upwardly from its normal position. The lever is provided with a slot 12 to receive the rod 3. The twine 13 is passed through between the lever and the end of the head and thence downwardly through the slot 12 to a weight 14, that fits loosely on the rod 3, so as to slide thereon. The weight has an eye 15, through which the twine is passed, and thence it extends upwardly through an eye or hole 16 in the other end of the head from that carrying the lever, and thence the twine passes downwardly, its end being left free for use. The twine may be strung through between the lever and head by raising the lever up into the position shown in Fig. IV, which will expose a sufficiently wide space to conveniently pass the twine through, or the head may be provided with a groove 17, through which the twine may be passed, as shown by dotted lines, Fig. II, and then be moved downwardly to a position between the lever and the end 11 of the head, so that when the lever is in its normal position the twine will be nipped between the lever and the under side of the end 11 of the head.

When the twine is to be used, the free end 18 is pulled downwardly, which causes the weight 14 to be raised, and when the weight reaches the lever 7 it moves the lever from the position shown in Fig. III to the position shown in Fig. IV, which loosens the twine and allows it to be drawn out for use. As soon as the twine is broken off and released the weight 14 descends, and immediately the lever 7 falls to its normal position and nips the twine again against the end 11 of the head, so that in falling the weight 14 takes up the loose end of the twine instead of drawing the twine off from the ball. Thus the end of the twine is drawn up out of the way until it is again wanted for use.

The device is inexpensive, durable, and effective in operation.

We claim as our invention—

1. In a take-up device for twine-holders, the combination of a head, a lever pivoted to the head and between which and the head the twine is adapted to pass, and a sliding weight through which the twine is passed adapted to contact with the lever which projects across the path of the weight; said lever being adapted to hold the twine when in its normal position and to release the twine when it is raised, substantially as set forth.

2. In a take-up device for twine-holders, the combination of a head, a lever pivoted to the head and between which and the head the twine is adapted to be passed, a rod depending from said head and adapted to support a twine-basket, and a weight loosely mounted on said rod and which is perforated to receive the twine and is adapted to contact with the lever which projects across the path of the weight; said head having a perforation through which the twine is passed after being threaded through said weight, substantially as set forth.

3. In a take-up device for twine-holders, the combination of a head having a lever pivoted to one end and the other end of which is perforated, a rod depending from said head and adapted to support a twine-basket, and a weight loosely fitting on said rod; the outer end of said lever being located beneath one end of the head so as to nip the twine between itself and the end of the head and to release the twine when raised by said weight coming in contact therewith, substantially as set forth.

4. In a take-up device for twine-holders, the combination of a head having a groove 17, a slotted lever pivoted to the grooved end of the head, a rod depending from the head and extending through the slot in the lever, and a weight loosely mounted on the rod; the end of the head opposite that to which the lever is pivoted being perforated for the passage of the twine, substantially as set forth.

WILLIAM H. TIVY.
JNO. E. HILL.

In presence of—
E. S. KNIGHT,
STANLEY STONER.